United States Patent [19]

Rolls et al.

[11] Patent Number: 4,948,207
[45] Date of Patent: Aug. 14, 1990

[54] ADJUSTABLE SUPPORT ASSEMBLY

[75] Inventors: Joyce A. Rolls, Floyd Knobs, Ind.; Clarence W. Denham; Nicholas Okruch, Jr., both of Louisville, Ky.

[73] Assignee: General Electric Company, Louisville, Ky.

[21] Appl. No.: 426,587

[22] Filed: Oct. 24, 1989

[51] Int. Cl.$^5$ .............................................. A47B 57/00
[52] U.S. Cl. .................................. 312/306; 248/243; 248/250; 248/188.4
[58] Field of Search ............... 312/306; 248/243, 250, 248/354.3, 188.4; 285/303

[56] References Cited

U.S. PATENT DOCUMENTS

| | | | |
|---|---|---|---|
| 76,232 | 3/1868 | Morse | 248/243 |
| 185,004 | 12/1876 | White. | |
| 193,686 | 7/1877 | Bowers | 285/303 |
| 1,209,029 | 12/1916 | Reese. | |
| 1,622,038 | 3/1927 | Lampert. | |
| 2,152,895 | 4/1939 | Longtin. | |
| 2,195,579 | 4/1940 | Murdock | 248/250 X |
| 2,872,144 | 2/1959 | Hobson | 248/243 X |
| 3,709,585 | 1/1973 | Tsai. | |
| 4,046,279 | 9/1977 | Rosler | 285/303 |
| 4,074,537 | 2/1978 | Gronlie. | |
| 4,729,613 | 3/1988 | Tromble et al. | |

Primary Examiner—Joseph Falk
Attorney, Agent, or Firm—Radford M. Reams; H. Neil Houser

[57] ABSTRACT

An adjustable support assembly particularly for use in supporting the bottom shelf in a household refrigerator including a support bracket having a hollow cylindrical sleeve with an interior circumferential surface having a first longitudinal portion with an array of inwardly directed elongated tooth projections along and substantially perpendicular to the longitudinal axis of the sleeve and a second longitudinal smooth portion adjacent the first portion. There is a brace having an outside diameter slightly smaller than the inside diameter of the sleeve and has a circumferential outer surface with a first longitudinal portion with an array of outwardly directed elongated tooth projections along and substantially perpendicular to the longitudinal axis of the brace and a second longitudinal smooth portion adjacent the first portion, said projections on the first portion being complementary to the tooth projections on the first portion of the interior surface of the sleeve. With this arrangement insertion of the brace into the sleeve with the tooth projections of the brace and sleeve in alignment with the smooth portion of the brace and sleeve allows relative longitudinal movement between the brace and sleeve and rotation of the brace and sleeve relative to each other engages and projections of the brace and sleeve to prevent relative longitudinal movement between the brace and sleeve.

6 Claims, 3 Drawing Sheets

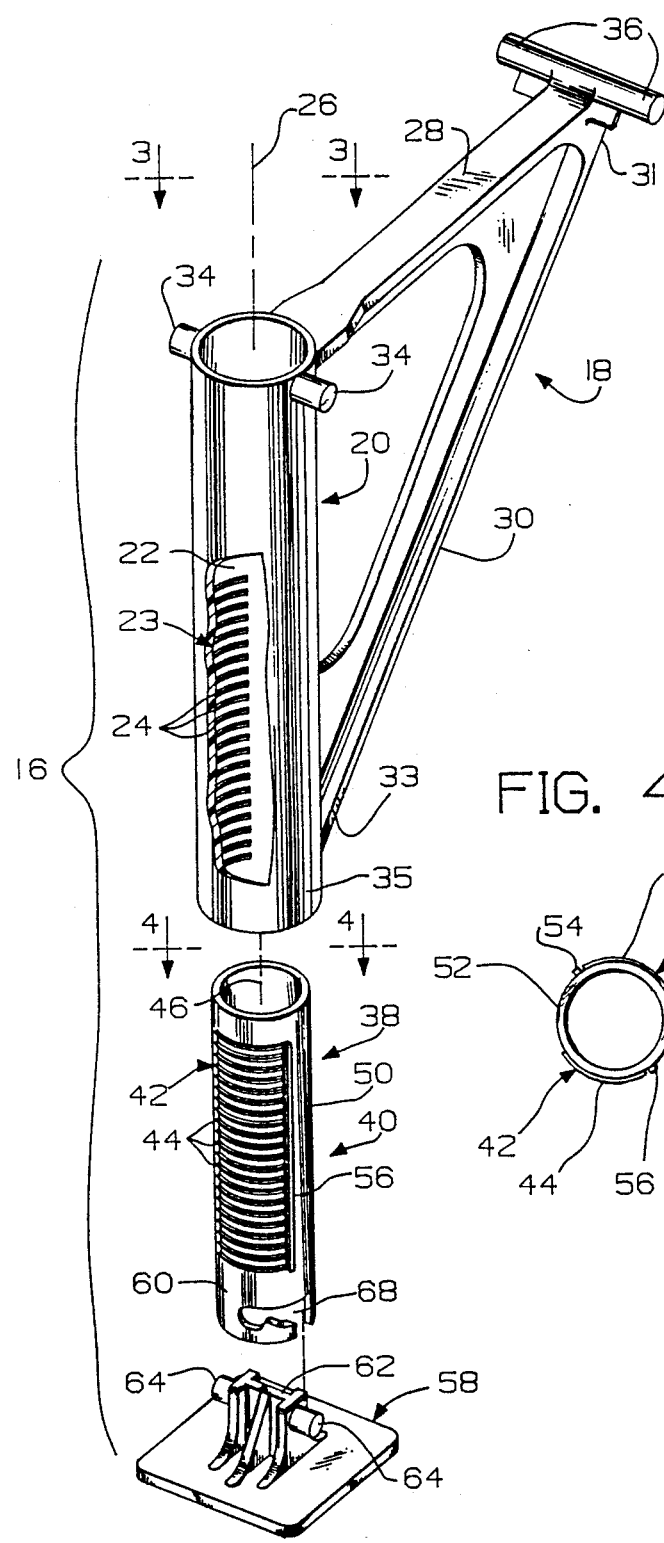
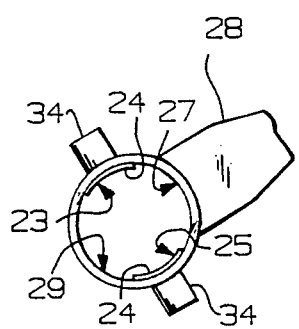
FIG. 3
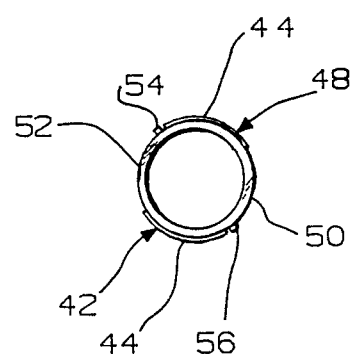
FIG. 4
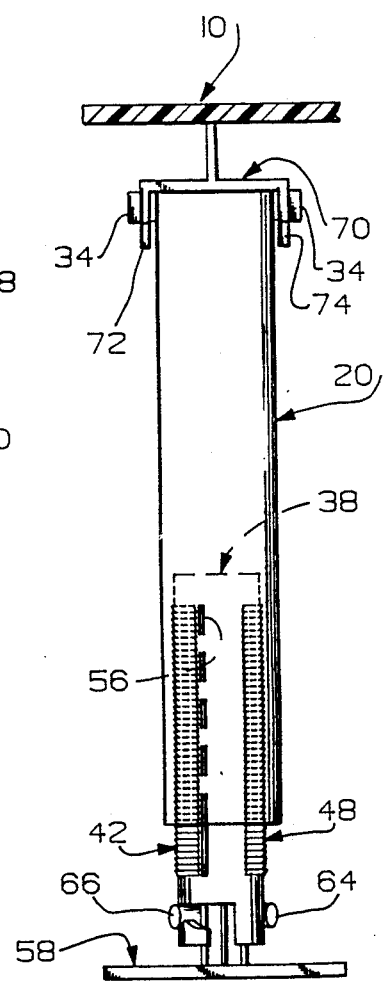
FIG. 2
FIG. 5

ADJUSTABLE SUPPORT ASSEMBLY

BACKGROUND OF THE INVENTION

This invention relates to an adjustable support assembly and in particular an adjustable support assembly useful in a household refrigerator to support the bottom shelf of the refrigerator. In many refrigerators the bottom shelf not only stores food items on top but also supports vegetable pans underneath that may be removable in and out for access to food stored in the pans. It is therefore important that the bottom shelf be rigidly supported to withstand the weight of the food items stored above the shelf and in the vegetable pans. One of the difficulties in providing such a rigid support is that in the manufacture of refrigerators there are tolerance differences from one refrigerator to the other and there is a need for the rigid support of the shelf to be adjustable to compensate for these tolerance differences. In addition, in some refrigerators the bottom wall of the interior of the refrigerator is inclined or sloped and the support for the bottom shelf rests on the inclined bottom wall, yet the support should be vertical for maximum rigid support of the shelf.

By this invention there is provided an adjustable support assembly which is particularly useful in supporting the bottom shelf of a household refrigerator that can have its height adjusted easily to compensate for tolerance differences that occur during the manufacture of these refrigerators and also means for accommodating an inclined surface upon which the adjustable support assembly rests to permit alignment of the support assembly with the vertical plane.

SUMMARY OF THE INVENTION

An adjustable support assembly including a support bracket having a hollow cylindrical sleeve with an interior circumferential surface, said surface having a first longitudinal portion with an array of inwardly directed elongated tooth projections along and substantially perpendicular to the longitudinal axis of the sleeve and a second longitudinal smooth portion adjacent the first portion. There is a brace having an outside diameter slightly smaller than the inside diameter of the sleeve and having a circumferential outer surface, said surface having a first longitudinal portion with an array of outwardly directed elongated tooth projections along and substantially perpendicular to the longitudinal axis of the brace and a second longitudinal smooth portion adjacent the first portion. The projections on the first portion being complementary to the projections on the first portion of the interior surface of the sleeve. With this arrangement insertion of the brace into the sleeve with the tooth projections of the brace and sleeve in alignment with the smooth portions of the brace and sleeve allows relative longitudinal movement between the brace and sleeve and rotation of the brace and sleeve relative to each other engages the projections of the brace and sleeve to prevent relative longitudinal movement between the brace and sleeve.

BRIEF DESCRIPTION OF THE DRAWINGS

FIG 2 is an exploded perspective view of the adjustable support assembly of the present invention with the components shown prior to assembly.

FIG. 3 is a top plan view taken along lines 3—3 of FIG. 2.

FIG. 4 is a top plan view taken along lines 4—4 of FIG. 2.

FIG. 5 is a front elevational view of the adjustable support assembly of the present invention.

DESCRIPTION OF THE PREFERRED EMBODIMENT

Figure 1:
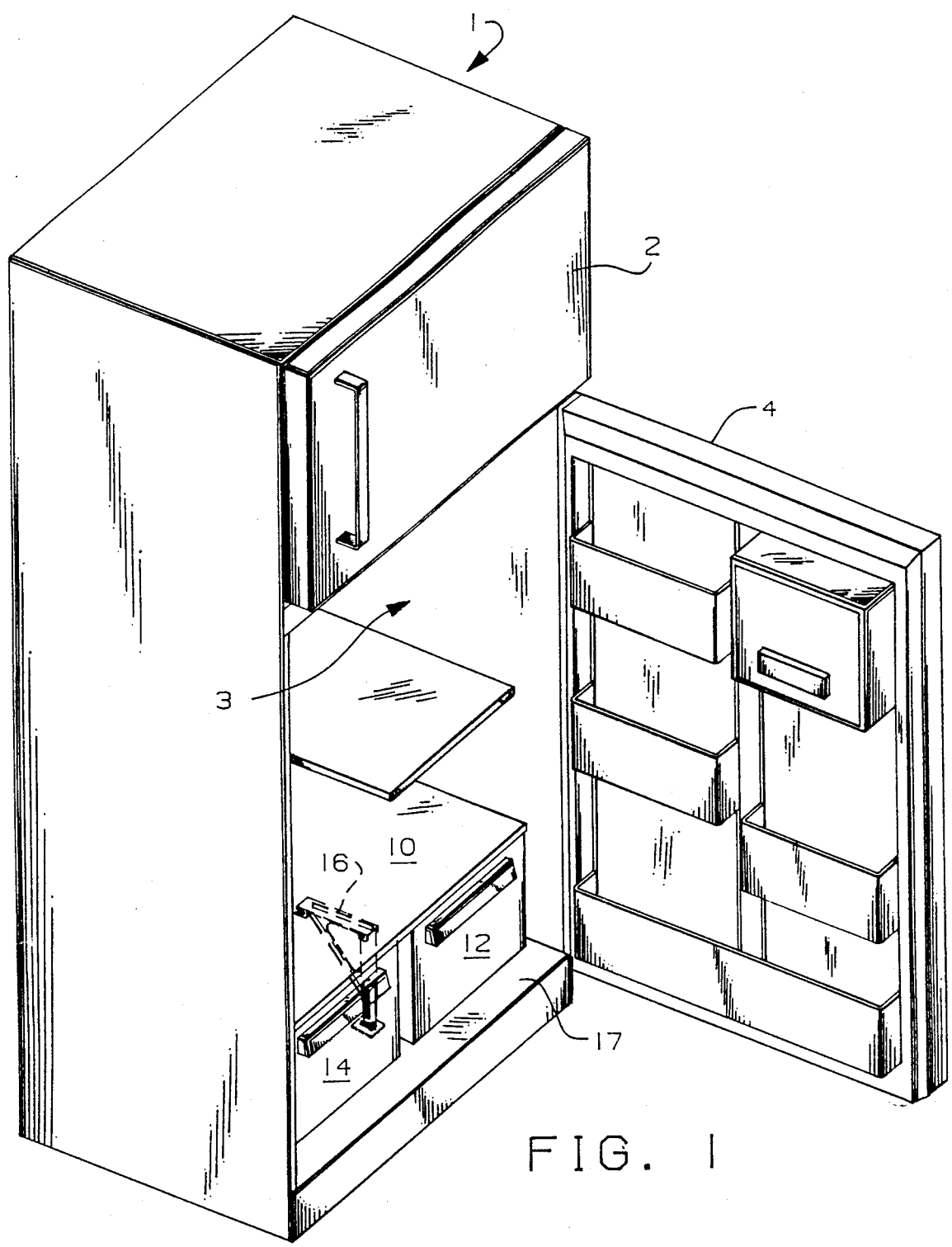
FIG. 1 a perspective view of a household refrigerator having a freezer compartment on top and a fresh food compartment on the bottom and embodying one form of the present adjustable support assembly.
Figure 6:
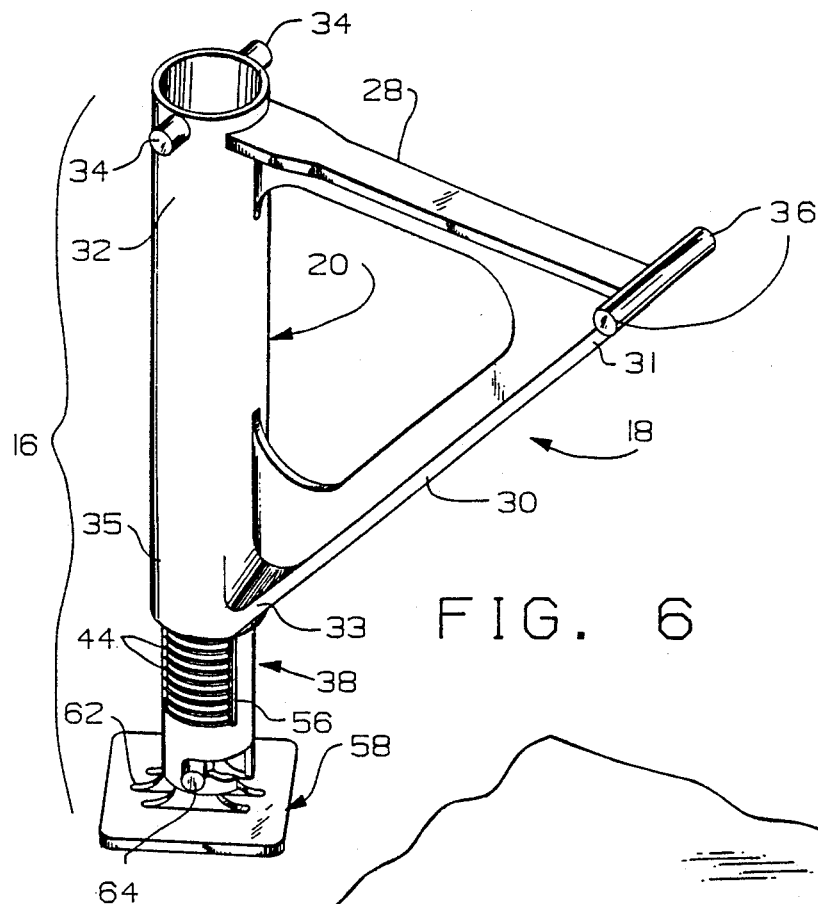
FIG. 6 is a perspective view of the adjustable support assembly of the present shown with the components assembled.

With particular reference to FIG. 1 of the drawings, there is shown one embodiment of the present invention in the form of a household refrigerator 1, including an upper freezer compartment which is closed by an access door 2 and a lower fresh food compartment 3 with an open access door 4. As is common in refrigerators of this design, the interior 3 of the fresh food compartment and the access door 4 have places for storing food items and in particular a bottom shelf 10 which supports vegetable pans 12 and 14 underneath. The vegetable pans may be slidably moved in and out from underneath the shelf by tracks that afford drawer-like movement. The bottom shelf 10 is usually secured to the side walls of the fresh food compartment and because of the weight of the food items stored on top of the shelf 10 and in the vegetable pans 12 and 14 there needs to be a center support which in the case of the preferred embodiment is an adjustable support assembly 16 to which this invention relates. The support assembly 16 rests on and is supported by a bottom wall 17 of the fresh food compartment 3.

With reference particularly to FIGS. 2-6, the adjustable support assembly 16 will be described. The adjustable support assembly includes a support bracket 18 which has a hollow cylindrical sleeve 20 with an interior circumferential surface 22. The interior surface 22 has a first longitudinal portion with an array 23 of inwardly directed elongated tooth projections 24 along and substantially perpendicular to the longitudinal axis 26 of the sleeve 20. In the preferred embodiment the sleeve 20 has two arrays 23 and 25 (FIG. 3) of longitudinal tooth projections and each array is 180° relative to the other array. In the preferred embodiment the support bracket 18 is triangular shaped with one leg being the sleeve 20, one leg 28 of the triangle being perpendicular to the sleeve 20 and joined at the top portion 32 thereof and the other leg 30 being the hypotenuse of the triangle with one end 31 joining the leg 28 at the end of leg 28 opposite from the sleeve 20 and the other end 33 joining the bottom portion 35 of the sleeve 20. Located at the top portion 32 of the sleeve 20 are two outwardly projecting pegs 34 which are in a plane that is perpendicular to the longitudinal axis of leg 28 of the support bracket 18. At the opposite end of leg 28 from the sleeve 20 where leg 28 and 30 join each other there are also outwardly projecting pegs 36 which again are perpendicular to the longitudinal axis of leg 28. Thus, the pegs 34 are in a plane and pegs 36 are in a plane which are parallel and spaced from each other. The purpose of these pegs will be discussed later.

Located between the first longitudinal portions with arrays 23 and 25 are second longitudinal smooth portions 27 and 29 which are also opposite from each other on the interior circumferential surface 22 of the sleeve 20 and are adjacent the first portions.

As shown in FIG. 2, located below the sleeve 20 in the exploded view is a brace 38 having an outside diameter slightly smaller than the inside diameter of the sleeve 20 and having a circumferential outer surface 40. The outer surface 40 has a first longitudinal portion with an array 42 of outwardly directed elongated tooth projections 44 along and substantially perpendicular to the longitudinal axis 46 of the brace 38. In the preferred embodiment as shown in FIG. 4, there are two arrays 42 and 48 180° apart on the outer surface 40 of the brace 38. Between and adjacent the arrays 42 and 48 are second longitudinal smooth portions 50 and 52. Located longitudinally along a portion or the entire length of the array of tooth projections 44 are stop means 54 and 56 which in the preferred embodiment is a raised rib that extends from one end of each array to the other end of the array.

With the above described structural arrangement of the sleeve 20 and brace 38 they are joined together by inserting the brace 38 into the sleeve 20 with the arrays 42 and 48 of tooth projections 44 in alignment with the smooth portions 27 and 29 of the sleeve. This allows relative longitudinal movement between the brace 38 and sleeve 20. By rotating the brace 38 and sleeve 20 in one direction relative to each other the tooth projections 44 of brace 38 engage the tooth projections 24 of the sleeve 20 to prevent relative longitudinal movement between the brace and sleeve. Stop means 54 and 56 will prevent rotating the brace 38 and sleeve 20 too far. While the drawings show that the tooth projections 24 of the sleeve 20 and 44 of brace 38 are perpendicular to the longitudinal axis 26 and 46 respectively, it will be understood that they may be slightly inclined relative to the axis and still mesh with each other. Hence, the array of tooth projections are referred to as being substantially perpendicular to the longitudinal axis.

As shown in FIG. 2 below the brace 38 is a tiltable foot 58 which is pivotally secured to the bottom portion 60 of the brace. The foot 58 has an upstanding center member 62 which has outwardly projecting pivot pins 64 which are received in open ended slots 68 one on each side of the brace 38 at the bottom portion 60 so that the foot 58 may swivel relative to the brace 38.

Figure 7:
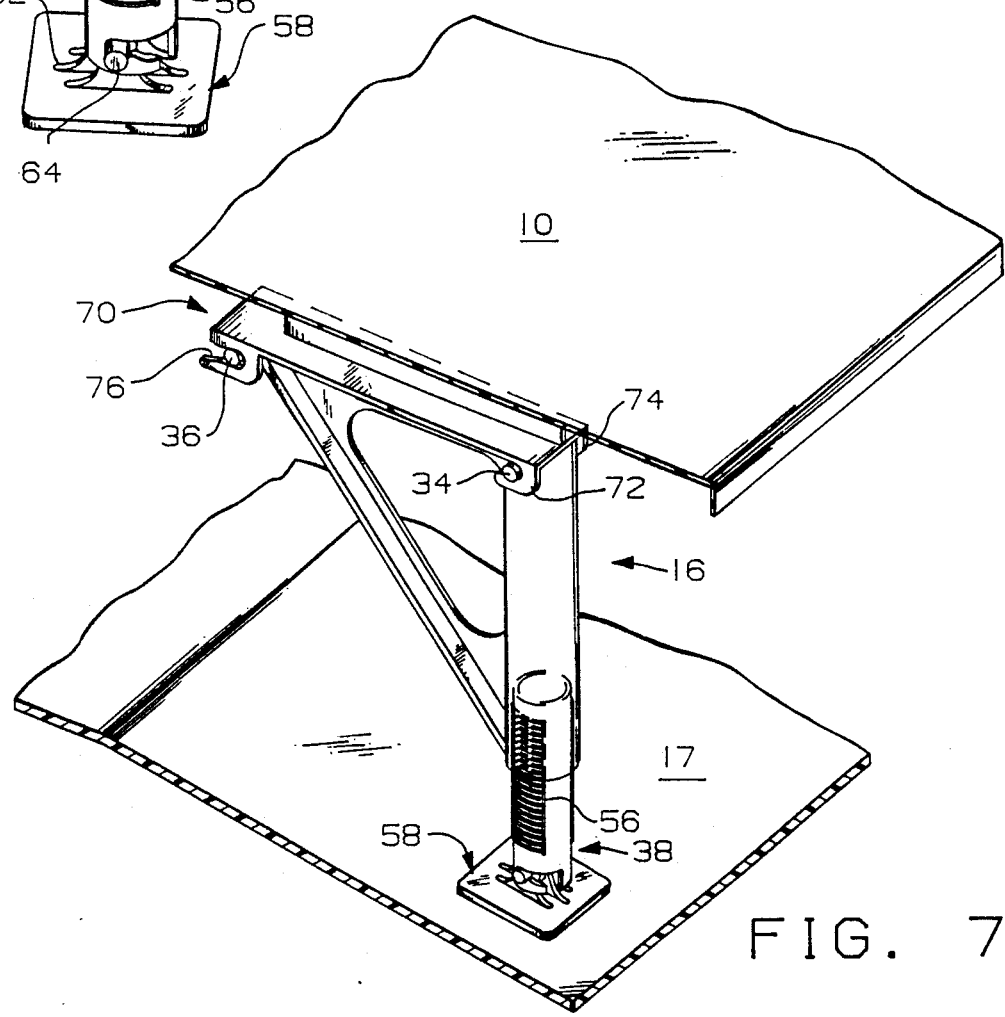
FIG. 7 is a perspective view showing the adjustable support assembly of the present invention secured to a shelf in the refrigerator of FIG. 1 and resting on the bottom of the interior compartment of the refrigerator shown in FIG. 1.

As shown particularly in FIGS. 5 and 7, the shelf 10 has secured to it a connector member 70 which in the preferred embodiment is a downwardly open channel with spaced apart legs 72 and 74. The connector member 70 also acts as the center slide track for the vegetable pans 12 and 14. These legs 72 and 74 have open ended slots 76 located at the front and rear on both legs of the connector member 70. The connector member 70 may be secured to the bottom shelf 10 in any suitable manner and in the preferred embodiment both the shelf and connector member are integrally molded from plastic material. The open ended slots 76 receive the pegs 34 and 36 of the support bracket 18 as shown particularly in FIG. 7. The foot 58 of the adjustable support assembly 16 rests on and is supported by the bottom wall 17 of the interior fresh food compartment 3 of the refrigerator. In some refrigerators this bottom wall 17 is not horizontal but is inclined several degrees from the horizontal plane. To accommodate the incline of the bottom wall 17 the foot 58 as described above is tiltable so that it is seated firmly against and flat on the bottom wall 17.

To adjust the support assembly 16 to support the bottom shelf 10, the brace 38, which is telescoped in sleeve 20, is rotated counterclockwise so that the arrays of tooth projections of the brace are in alignment with the smooth portions 27 and 29 of the sleeve so that the brace and sleeve can have relative longitudinal movement to adjust for the correct distance or height between the bottom wall 17 and shelf 10. Once the correct height adjustment for affording rigid support of the shelf is found, then the brace 38 is rotated clockwise so that the tooth projections of the brace and sleeve engage each other to prevent relative longitudinal movement between the brace and sleeve. The stop means 54 and 56 on the brace allows engagement of the tooth projections only when it is rotated in one direction which in the drawings is clockwise. The reason for this is to prevent rotating past engagement of the arrays of tooth projections and to orient the position of the tiltable foot 58 correctly so that it may pivot to accommodate the inclined surface of the bottom wall 17.

If it is desirable to remove the adjustable support assembly from its position supporting the shelf 10 and resting on the bottom wall 17, the brace 38 may be rotated so that the arrays 42 and 48 of tooth projections 44 align with the smooth portions 27 and 29 of the sleeve 20 and the brace may be telescoped further into the sleeve 20, thus relieving the tension of the foot on the bottom wall 17 and the entire adjustable support assembly may be removed by disengaging the pegs 34 and from the connector member 70.

In the preferred embodiment all of the components of the adjustable support assembly are molded from suitable plastic and are connected to one another without the need of screws or other type separate fasteners.

The foregoing is a description of the preferred embodiment of the invention and it should be understood that variations may be made thereto without departing from the true spirit of the invention as defined in the appended claims.

What is claimed is:

1. In a refrigerator having an outer case and an inner liner forming an interior compartment with a bottom wall comprising:

a bottom shelf in the compartment, a connector member secured to the bottom surface of the shelf, a shelf support bracket secured to the connector member, said bracket having a hollow cylindrical sleeve with an interior circumferential surface, said surface having a first longitudinal portion with an array of inwardly directed elongated tooth projections along and substantially perpendicular to the longitudinal axis of the sleeve and a second longitudinal smooth portion adjacent the first portion, and a brace supported on the compartment bottom wall and having an outside diameter slightly smaller than the inside diameter of the sleeve and having a circumferential outer surface, said surface having a first longitudinal portion with an array of outwardly directed elongated tooth projections along and substantially perpendicular to the longitudinal axis of the brace and a second longitudinal smooth portion adjacent the first portion, said projections on the first portion being complementary to the projections on the interior surface of the sleeve, whereby insertion of the brace into the sleeve with the tooth projections of the brace and sleeve in alignment with the smooth portions of the brace and sleeve allows relative longitudinal movement between the brace and sleeve and rotation of the brace and sleeve relative to each other engages the projections of the brace and sleeve to prevent relative longitudinal movement between the brace and sleeve.

2. In the refrigerator of claim 1 wherein both the brace and sleeve have two arrays of longitudinal tooth projections and each array is 180° relative to the other array in both the brace and sleeve.

3. In the refrigerator of claim 1 wherein one of the arrays of tooth projections of the brace and sleeve has stop means longitudinally along a portion of the tooth projections to prevent the tooth projections of the brace and sleeve from engaging each other upon rotation of the brace and sleeve relative to each other.

4. In the refrigerator of claim 1 wherein the brace has a tiltable foot secured to the end of the brace remote from the sleeve for inclined tilt adjustment of the support assembly.

5. In the refrigerator of claim 1 wherein the support bracket is triangular shaped with the first leg of the triangle being the sleeve, the second leg of the triangle being perpendicular to the sleeve and the third leg being the hypotenuse of the triangle.

6. In the refrigerator of claim 5 wherein the connector member is a downwardly open channel with spaced apart legs, said legs having open ended slots and the second leg of the support bracket has outwardly projecting pegs received in the open ended slots of the connector member.

* * * * *